US009912646B2

(12) United States Patent
Kundu et al.

(10) Patent No.: US 9,912,646 B2
(45) Date of Patent: *Mar. 6, 2018

(54) AUTOMATIC SECURITY PARAMETER MANAGEMENT AND RENEWAL

(71) Applicant: INTERNATIONAL BUSINESS MACHINES CORPORATION, Armonk, NY (US)

(72) Inventors: Ashish Kundu, Yorktown Heights, NY (US); Ruchi Mahindru, Yorktown Heights, NY (US); Ajay Mohindra, Yorktown Heights, NY (US); Valentina Salapura, Yorktown Heights, NY (US); Mahesh Viswanathan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,444

(22) Filed: Mar. 7, 2016

(65) Prior Publication Data

US 2016/0191477 A1    Jun. 30, 2016

Related U.S. Application Data

(63) Continuation of application No. 14/192,204, filed on Feb. 27, 2014, now Pat. No. 9,325,703.

(51) Int. Cl.
*H04L 29/00* (2006.01)
*H04L 29/06* (2006.01)

(52) U.S. Cl.
CPC ............ *H04L 63/06* (2013.01); *H04L 63/083* (2013.01); *H04L 63/0823* (2013.01); *H04L 63/0846* (2013.01); *H04L 63/20* (2013.01)

(58) Field of Classification Search
CPC ... H04L 9/3263; H04L 63/105; H04L 9/3268; G06F 21/41; G06F 21/33
See application file for complete search history.

(56) References Cited

U.S. PATENT DOCUMENTS 7,523,318 B2    4/2009  Goal et al.
2002/0156879 A1*  10/2002  Delany ................. H04L 63/102
                                                    709/223

(Continued)

FOREIGN PATENT DOCUMENTS

EP          1769419 B1    11/2012

OTHER PUBLICATIONS

U.S. Notice of Allowance dated Jan. 6, 2016 in co-pending U.S. Appl. No. 14/192,204.

(Continued)

*Primary Examiner* — Ghazal Shehni
(74) *Attorney, Agent, or Firm* — Louis J. Percello, Esq.; McGinn IP Law Group, PLLC

(57) ABSTRACT

A method of automatic security parameter renewal includes determining if a security parameter satisfies a renewal condition, and automatically updating the security parameter when the renewal condition is satisfied. The automatically updating the security parameter includes modifying a certificate in dependent components of an application of the security parameter, by a central certification server, upon receipt of a new certificate.

19 Claims, 5 Drawing Sheets

(56) References Cited

U.S. PATENT DOCUMENTS

| | | |
|---|---|---|
| 2008/0196090 A1 | 8/2008 | Baron et al. |
| 2010/0180335 A1 | 7/2010 | Smithson |
| 2011/0125655 A1 | 5/2011 | Chiyo et al. |
| 2011/0126001 A1* | 5/2011 | Fu .................. H04L 63/0823 |
| | | 713/156 |
| 2012/0278241 A1 | 11/2012 | Brown et al. |
| 2013/0024947 A1* | 1/2013 | Holland .................. G06F 21/34 |
| | | 726/28 |

OTHER PUBLICATIONS

U.S. Office Action dated Feb. 27, 2015 in co-pending U.S. Appl. No. 14/192,204.

U.S. Office Action dated Jul. 22, 2015 in co-pending U.S. Appl. No. 14/192,204.

* cited by examiner

AUTOMATIC SECURITY PARAMETER MANAGEMENT AND RENEWAL

The present application is a Continuation Application of U.S. patent application Ser. No. 14/192,204, filed on Feb. 27, 2014, the entire content of which is incorporated herein by reference.

BACKGROUND OF THE INVENTION

Field of the Invention

The present invention generally relates to a method, system and computer program for automatic management and renewal of a security parameter.

Description of the Related Art

In today's ever-growing digital world, system security is at a premium. A balance, however, must be struck between the utmost security, and the functionality of the system. Indeed, even the most secure system is useless if it cannot function. Time lost due to security issues can cause inconvenience, and ultimately a financial loss.

The expiration of security parameters (i.e. password expiration, license expiration, secure/private key expiration, secure socket layer (SSL) certificate expiration, cookies expiration, etc.) is a common and reoccurring issue.

Further, security parameters may need to be immediately reset should the system be compromised in some way, be it by malicious or accidental means. Security parameters may also need to be reset across multiple subcomponents. A premium is placed on achieving such a resetting without affecting the working of the solution (i.e. needs to be fast).

As an example, consider an integrated solution on a cloud offered as a service. In such an integrated solution, passwords are heavily relied upon as the mode of authentication at integration points or within the same component (i.e. a database or an application server).

Conventional approaches may not be able to prevent system malfunctions, and may not be able to properly diagnose and respond to those malfunctions that do occur. Hours, if not days, of downtime to identify, fix and update security issues are a price few can afford.

SUMMARY OF THE INVENTION

A first exemplary aspect of the present invention includes a method of automatic security parameter renewal; the method including determining if a security parameter satisfies a renewal condition and automatically updating the security parameter when the renewal condition is satisfied.

Another exemplary aspect of the present invention includes a computer program product for automatic security parameter renewal, the computer program product including a computer readable storage medium having program code embodied therewith, the program code executable by a device to perform a method of automatic security parameter renewal, the method including determining if a security parameter satisfies a renewal condition and automatically updating the security parameter when the renewal condition is satisfied.

Yet another exemplary aspect of the present invention includes a system for automatic renewal and management of a security parameter, the system including an automatic distribution component for distributing information related to the security parameter; and an automatic renewal component for updating the security parameter.

Still another exemplary aspect of the present invention includes a security parameter management system, the system including a security parameter service for managing a plurality of security parameters within an integrated solution an automatic security parameter generator which communicates with the security parameter service.

According to the above and other exemplary aspects of the present invention, it is possible to employ a policy based security mechanism for a broad range of security parameters, and to reduce downtime and enable better resiliency of cloud solutions.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
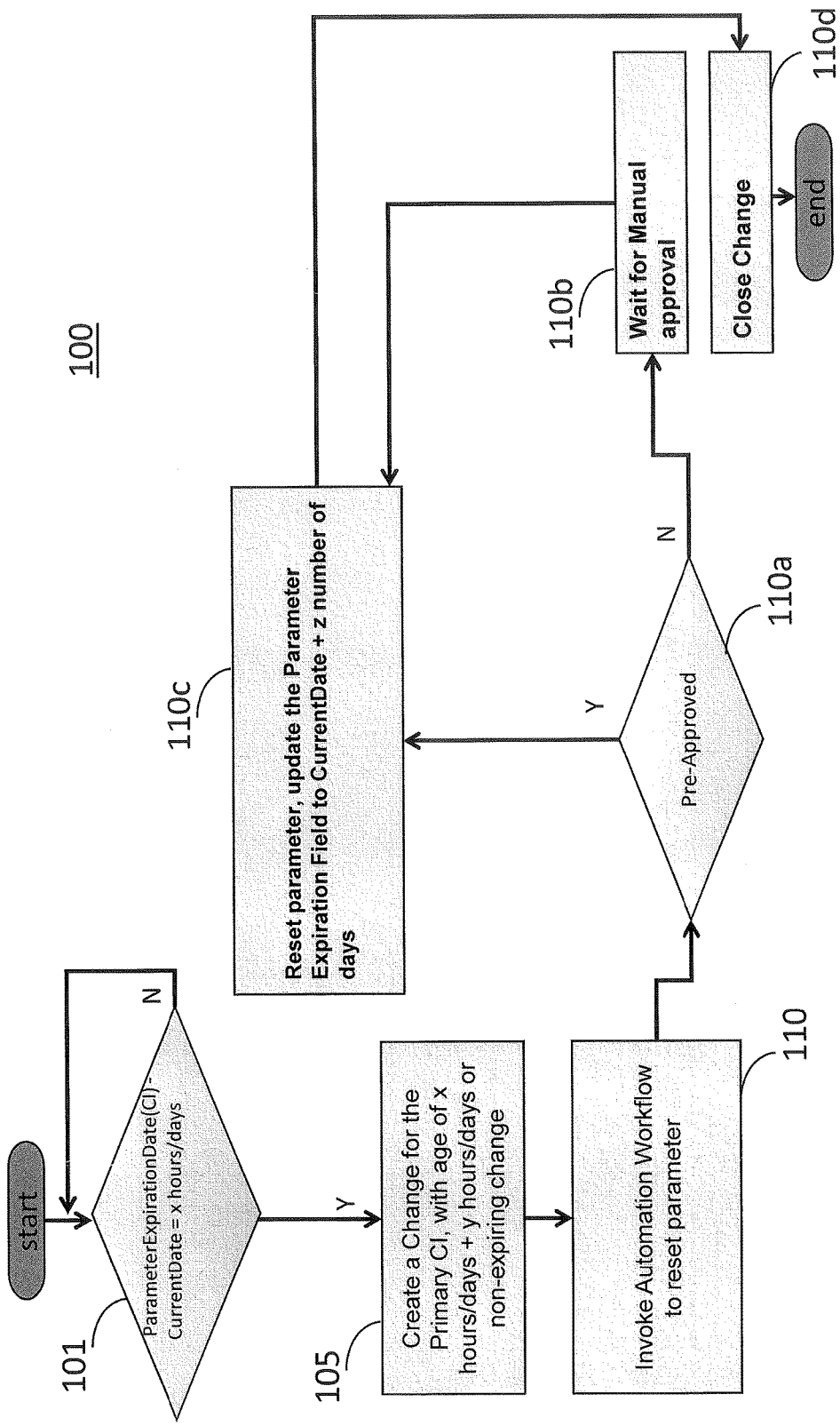
FIG. 1 depicts a workflow 100 for a system and method according to an exemplary embodiment of the present invention.

Referring now to the drawings, and more particularly to FIGS. 1-5, there are shown exemplary embodiments of the method and structures according to the present invention.

The foregoing and other exemplary purposes, aspects and advantages will be better understood from the following detailed description. The detailed description describes various features and functions of the disclosed systems, methods and computer program products with reference to the accompanying figures. In the figures, similar systems typically identify similar components, unless context dictates otherwise. The illustrative systems, methods and computer program products are not meant to be limiting. It will be readily understood that certain aspects of the disclosed systems and methods can be arranged and combined in a wide variety of different configurations, all of which are contemplated herein.

As noted above, system resiliency, and a reduction of down time are critical.

According to various exemplary aspects, the present invention enables automatic generation and updating of security parameters across a whole of an integrated solution. Further, the present invention enables automatic, real-time detection of security parameter expirations for an integrated solution.

The present invention can generate and/or re-generate the security parameters for all integration points securely without having to store them. Upon the occurrence of a compromise or such other events, some or all the security parameters can be changed automatically.

The present invention can also address the problem of security parameter expiration and outages in integrated solutions. Additionally, the present invention can utilize a single seed for generating security parameters for a topology of hosts/components.

The present invention can also utilize component interdependency tracking and further can automatically authenticate such components.

The present invention can employ an automatic approval process for authentication renewal. The present invention can differentiate between approval required, and automatic generation of new credentials.

The present invention may be utilized for a wide range of parameters and authentication protocols such as tokens and private keys.

FIG. 1 illustrates an exemplary embodiment of the present disclosure. A workflow 100 of an exemplary system and method is shown.

The present invention may utilize various information stored within different tables. Such tables, may, for example, be stored or maintained in a central management unit.

An asset table may be used to keep track of application instances deployed across the system. Such instances can include, for example, one or more of a Primary Configuration Item (CI), an Internet Protocol (IP) address, a Secondary Configuration Item, an InteractionProtocolExpirationDate (IPED), and a status indicating whether there has been a pre-approval.

In Step 101, a policy is triggered when InteractionProtocolExpirationDate for a given CI is InteractionProtocolExpriationDate−CurrentDate≤x hours/days. That is, when the difference between IPED and the current date is less than or equal to x, a policy is triggered. The value x represents a threshold of how far out from an expiration date a security parameter should be changed. Step 101 determines whether the threshold has been reached (i.e. whether the amount of time between the expiration date and the current date has reached or exceeded the threshold value.) If x is greater than IPED−Current Date, then decision N will hold true, and the step will be repeated. If x is less than or equal to IPED−Current Date, then decision Y will hold true, and the process will move forward.

The threshold value x may be, for example, set in advance, and may be any desired amount of time. The frequency at which the determination in Step 101 is performed may also be varied. Step 101 may be, for example, performed continuously. The frequency can be a configurable variable and can be changed at any time.

If the above condition is true, then Step 105 is performed. In Step 105, a change with a special classification is opened against the Primary CI, with an age of x hours/days+y hours/days or non-expiring change. The value x represents the duration after which the parameter value must be reset. The value y is the duration of the change. The idea is to block any other changes from happening against the Primary CI until the interaction parameter is changed The classification from Step 105 in turn, invokes an automation workflow in Step 110. The classification can also be referred to as the type of change. Each classification may have a different type of automation workflow attached to it, leading to different steps being invoked. An automation workflow may be invoked to change a password, renew a license, or extend an SSL certification, for example.

Step 110a determines whether a pre-approval has been obtained. If the Pre-approved field is set to Y (i.e. if pre-approval has been given), then the process moves to Step 110b and the interaction parameter is reset automatically and the IPED is set to CurrentDate+z days. If the Pre-approved field is set to N (i.e. pre-approval has not been obtained), then the process must wait until manual approval is given in Step 110b.

Such manual approval may be given, for example, by a user, an administrator, or anyone else authorized to do so. The value of z may also be set in advance, or may be set to default to a certain value if not otherwise changed. The value of z may represent how long until the newly reset parameter expires.

Once the parameter has been reset and the IPED is updated, the change is then closed in Step 110d.

The above exemplary workflow makes it possible, for example, to proactively change security parameters across multiple sub components before the security parameter for any sub component expires.

Figure 2:
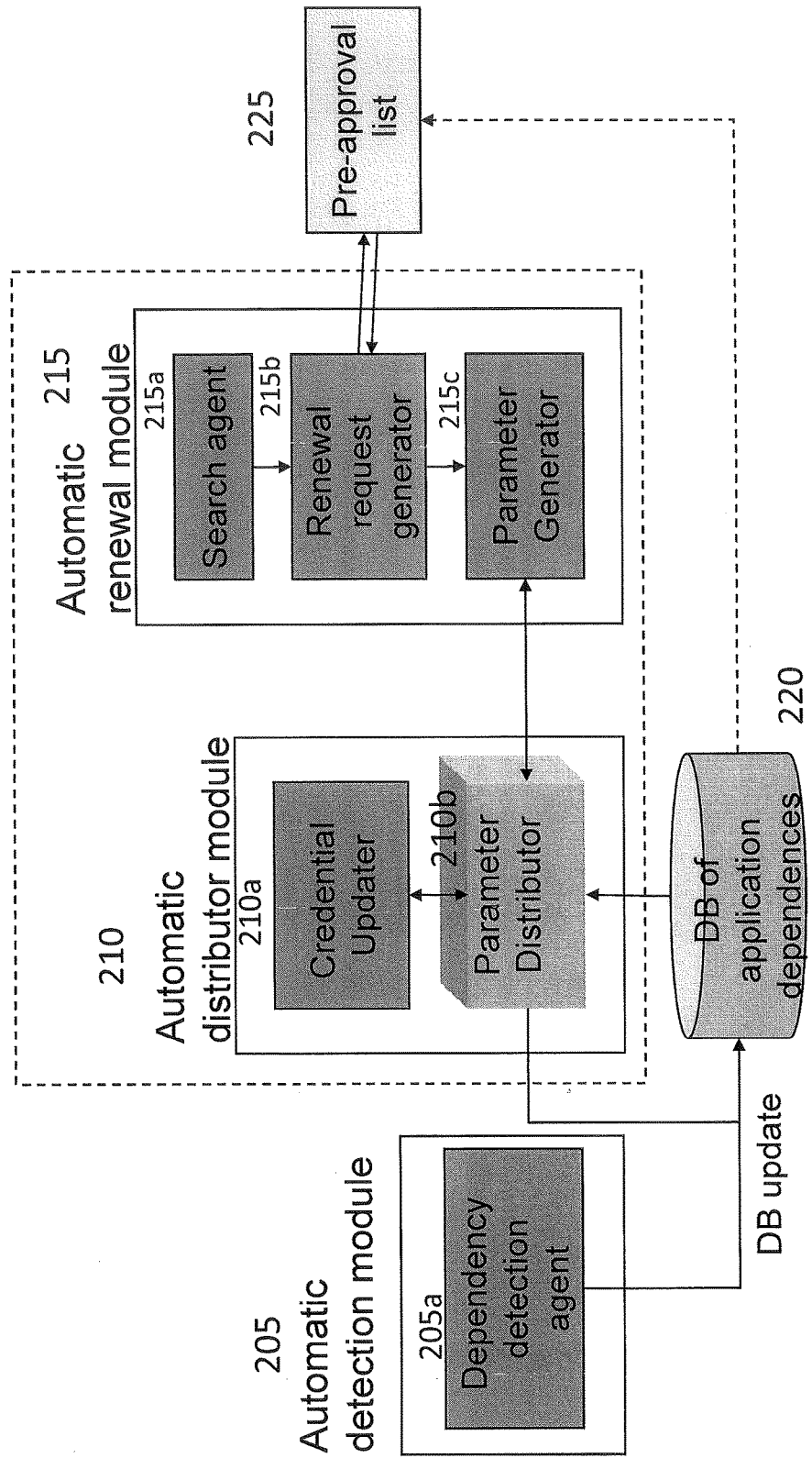
FIG. 2 depicts an automated parameter renewal system 200 according to an exemplary embodiment of the present invention.

FIG. 2 depicts an automated parameter renewal system 200 according to an exemplary embodiment of the present invention.

The system includes an Automatic Detection Module 205, an Automatic Distributor Module 210, an Automatic Renewal Module 215, a Database 220, and a Pre-Approval list 225.

The Automatic Detection Module 205 can utilize information relating to security parameter dependency. Such dependency information, among other things, may be stored in the Database 220. The dependency information may include one or more of a Primary Configuration Item, interaction information of the Primary CI, an interaction parameter, an interactionProtocolExpirationDate, a pre-approved/approval status, and a status of the last date a parameter was updated. The Automatic Detection Module 205 includes a Dependency Detection Agent 205a. The Dependency Detection Agent 205a may be used to detect various dependency information of various security parameters. The Automatic Detection Module 205 may also update information in the database 220 when necessary.

The Automatic Distributor Module 210 communicates with the Automatic Detection Module 205 to retrieve dependency information. The Automatic Distributor Module 210 includes a Credential Updater 210a and a Parameter Distribution Agent 210b.

The Automatic Renewal Module 215 can utilize the dependency information and then automatically and transparently follow the steps necessary to renew credentials needed for the interaction of all application components. The Automatic Renewal Module 215 includes a Search Agent 215a, a Renewal Request Generator 215b, and a Parameter Generator 215c. The Automatic Renewal Module 215 can also check to see if a pre-approval has been given. Information on pre-approval may be obtained, for example, from the pre-approval list 225. If pre-approval exists, the Automatic Renewal Module 215 can automatically proceed with the renewal, without any human interaction. The Automatic Detection Module 205, the Automatic Distributor Module 210, and the Automatic Renewal Module 215 may be implemented in any programming language as a computer program on various applicable machines. The Database 220 can be any type of database. The Pre-Approval list 225 may be, for example, a list stored in a data file or in a table in the database.

Dependency information between components (for example, a database and a testability server) can be crucial to a solution-based automatic security parameter management. Additionally, if the components are on a critical path, then different renewal policies with different weights may apply.

Dependency information can further include, for example, the integration of components over a network that relies on security parameters (i.e. between a remote database and a testability server)

Dependency information can also include the integration of components on the same Virtual Machine (VM), such as between an administrator sever and a testability server or between a Messaging Queue (MQ) and a testability server.

Utilization of the dependency information within the present invention can allow all the applications which are dependent on the component with the changed security parameter, to seamlessly and automatically reflect the change in said security parameter.

Consider, as an example, a database which relies on a certain security parameter to communicate or otherwise function with an administrator server. The database will no longer be able to function appropriately once the security parameter is changed, unless the change is also reflected in the database.

It is clear from the above example, that it is crucial to the overall functionality of the system that the dependencies be updated with the changed security parameter.

Security parameter generation in the present invention may use knowledge of one or more dependencies in order to generate appropriate security parameters.

The security parameters may be generated for each component user but also for each dependency. Thus, even if a command to change a security parameter comes from an administrator or a user, the present invention can enable a change of the parameter for all components. Accordingly, such global changes can be made, for example, based on a command, or a policy.

It is noted that by generating parameters for all the components and dependencies together, "randomness" between the parameters can be ensured. Ensuring randomness can decrease the susceptibility of the various components to compromise (e.g., a hacker), as well as decreasing the susceptibility of the system as a whole.

As can be readily seen, the ability to automatically update various security parameters without requiring the time of a user or administrator is a great potential benefit. Further, being able to preempt problems before they occur or immediately after occurrence (i.e. in the case of a compromise), provides yet another important potential benefit.

It is also noted with respect to pre-approval, that there are certain types of parameters, which under certain conditions may not allow pre-approval and must go through a manual approval step. (e.g. in a Cloud like environment a customer must follow certain compliance guidelines and hence all or certain parameter changes must go through manual approval.) Thus, pre-approval may only be possible for certain parameters.

Figure 3:
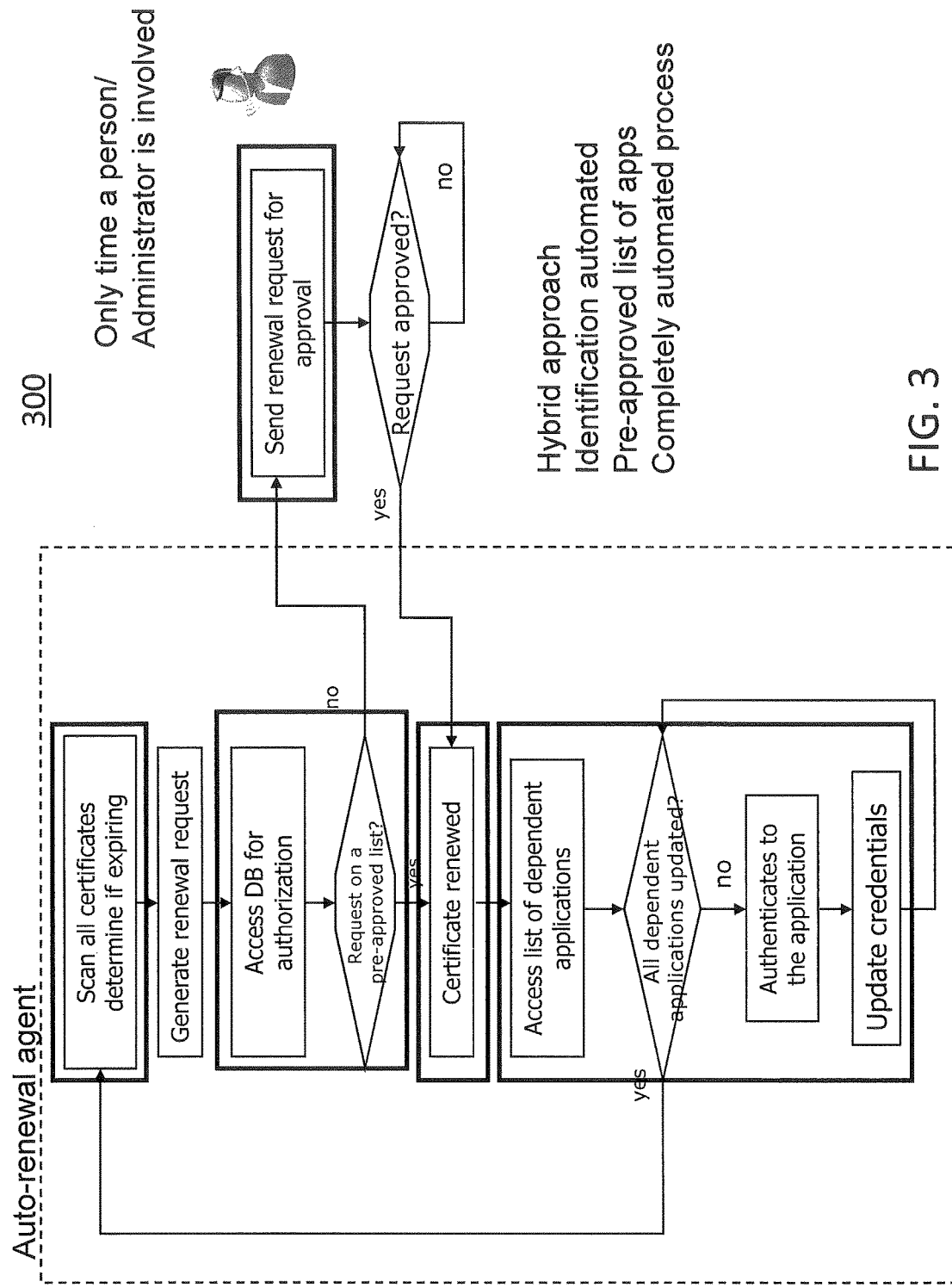
FIG. 3 provides a more detailed look at an automatic renewal module 300 according to an exemplary aspect of the present invention.
Figure 4:
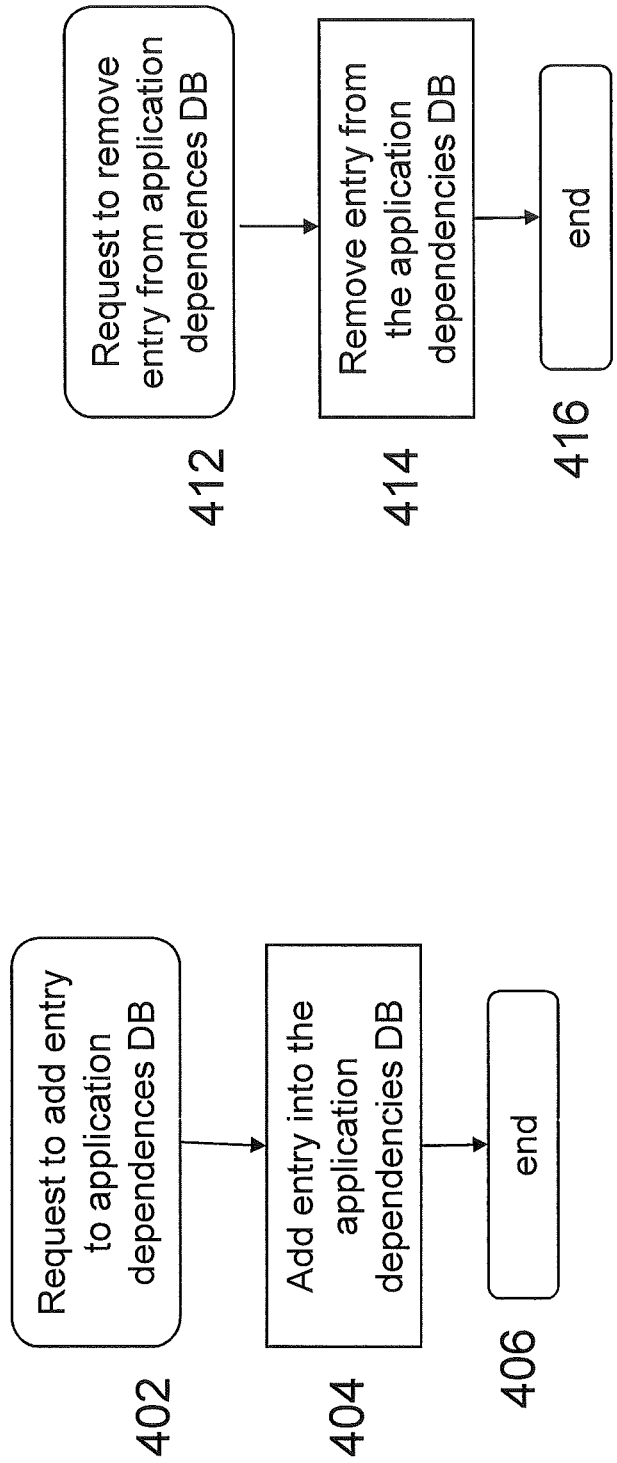
FIGS. 4A and 4B depict an exemplary workflow for updating data in an application dependencies database according to an exemplary embodiment of the present invention.

FIG. 3 provides a more detailed look into the functioning of an automatic renewal module 300 according to an exemplary aspect of the present invention. The figure represents a state flow of an exemplary operation of the exemplary system 200 depicted in FIG. 2.

The automatic security parameter renewal process begins with step 310 which includes scanning all security parameters in the system to determine if such security parameters are expiring/expired or still valid. This operation may be performed by the search agent 215a. If it is determined that a parameter has expired or is about to expire, it triggers generation of a renewal request in step 312. This function may be performed by the renewal request generator 215b as a part of automatic renewal module 215. In certain exemplary embodiments, the criteria to determine if a security parameter expired are given in Step 101 of the exemplary workflow of FIG. 1. In other exemplary embodiments, different criteria may be used.

In step 314, the data about the authorization for these security parameters is accessed. In one embodiment, such data is part of a database with application dependencies 220. In another embodiment, this data is contained in another database, like an application database, or some other database. In still another embodiment, such information is not part of any database, but is instead buffered and is accessible to the renewal request generator.

The authorization information accessed in step 314 includes, for example, information on security parameters which need renewal, whether renewal for a parameter is pre-approved and does not need any human action, or manual intervention, or whether there is a lack of pre-approval and thus a notification needs to be generated and sent to an agent to approve renewal.

Automatic renewal can be used, for example, for extending security parameters between multiple computing systems, or different applications. An example of renewal which requires approval can be used for extending accounts and access to human users, or to computing systems which tend to change more frequently. Other factors, such as security, sensitivity, and corporate policy or any other factor can be used to determine for each password protected communication if it can be automatically renewed or not.

If a requested security parameter generation is identified to be on a security parameter pre-approved list, as determined in step 316, then the control transfers to step 317. If an agent approval is needed, then the control transfers to 318 to send a renewal request for approval to the appropriate agent.

It is noted that such a request can be sent in the form of an e-mail, or it can be created as an entry in a database, or any other way that can be used to notify an agent that approval is needed, without departing from the scope of this invention.

If the approval for certificate renewal is rejected after review, then the request for certificate renewal is discarded in step 321. In one embodiment, the refusal to renew a certificate will result in marking the particular account as inactive. In another embodiment, the rejected renewal triggers removal of the dependency (i.e., Step 412, infra) in the application dependencies DB 220.

If the request for renewal is approved by an approval agent in 320, the control flow proceeds to step 317, where a new parameter is created. This functionality is located within the parameter generator module 215c. In one embodiment, renewal parameters are generated randomly. In another embodiment, generated parameters for renewed parameters follow certain algorithms for generation. In one embodiment, the time until which the new certificate is going to be valid is given in Step 105 of the exemplary workflow of FIG. 1. Further, various other methods can be used for generated renewed parameters without departing from the scope this patent.

Once the parameter is renewed, or if a new parameter is created, the parameter needs to be distributed to all dependent systems or applications. This function is implemented as the parameter distributor 210b.

Returning to step 322, the list of dependencies or dependent applications which need to receive this parameter is accessed by the parameter distributor 210b. This information is retrieved from the application dependencies DB 220.

When the list of dependent applications is available, the parameter distributor 210b starts updating dependent applications. If all dependent applications are updated, as determined in step 324, then the control transfers back to step 310.

For each dependent application, the new parameter needs to be provided to the application, as listed in step 326. This function is contained in the credential update module 210a. The parameters are not only distributed, but the old parameters and/or credentials are updated to the new value in 210a. In one embodiment, function 210a is located on a central certification server, from where it accesses all remote servers, processes, or applications and updates the certificate. In another embodiment, this function is implemented locally in the servers, processes or applications, and upon a receipt of the new certificate it modifies the certificate. In yet another embodiment, this module incorporates also triggering of the authentication process. In yet another embodiment, no authentication is triggered but the renewed certificate is saved in the appropriate location. Further, various other methods for updating parameters can be used without departing from the scope of this invention.

FIGS. 4A and 4B depict updating of data in the application dependencies DB 220 from the exemplary system of FIG. 2. Entries in the database can be triggered automatically—as a result of executing the renewal process, or can be performed manually by a system operator.

FIG. 4A illustrates adding of a new entry into the DB 220. In Step 402, a request to add an entry to the application dependencies database is made. In Step 404, the requested entry is performed.

FIG. 4B illustrates removal of an entry from the DB 220. In Step 412, a request to remove an entry from the application dependencies database is made. In Step 414, the requested removal is performed.

As noted above, in certain exemplary embodiments, if a request for renewal is denied, removal of dependency of the security parameter for which the request was denied may be performed.

Figure 5:
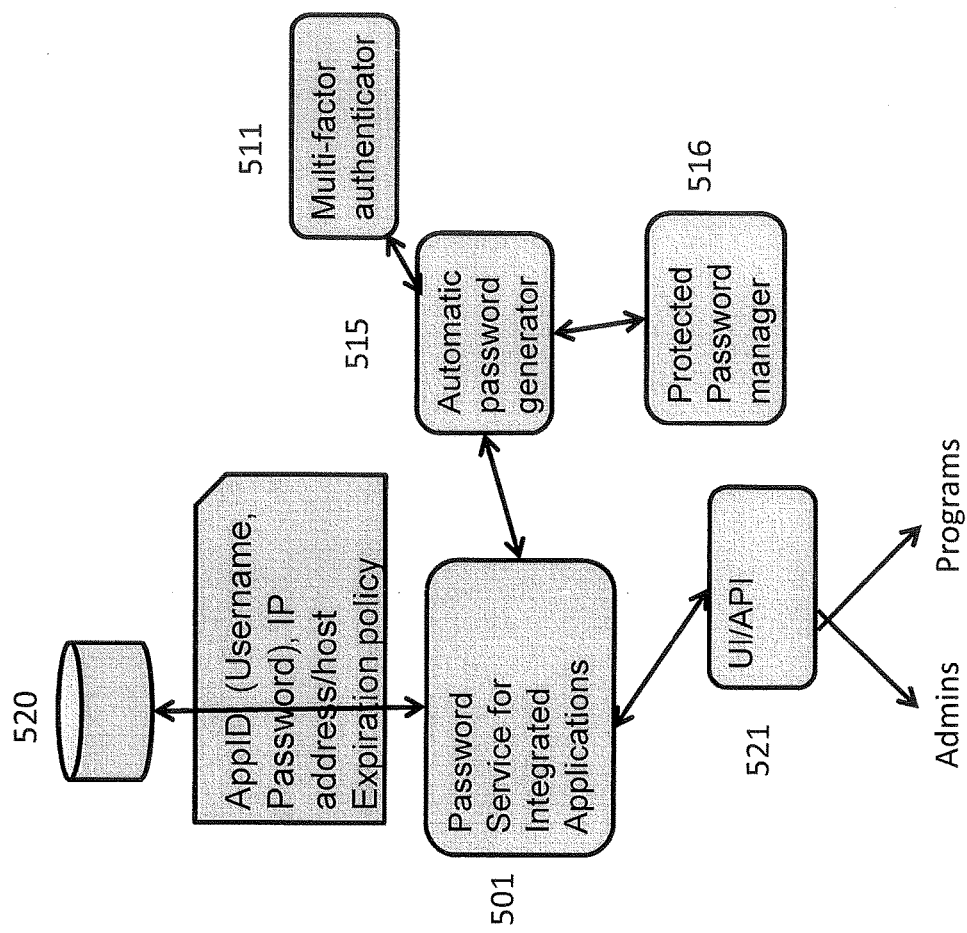
FIG. 5 depicts a password service architecture according to an exemplary embodiment of the present invention.

FIG. 5 depicts an example of password service architecture according to an exemplary embodiment of the present invention.

The example password service architecture includes a Password Service 501, a Multifactor Authenticator 611, an Automatic Password Generator 515, a Protected Password Manager 516, a Database 520 and an Interface 521.

The Password Service 501 can actively change based on data contained in the Database 520. A determination is made by the Password Service 501, whether a change needs to be made. If no change is determined necessary, then nothing will happen. The Password Service 501, however, is ready to heed any commands that may come from a user or administrator.

Further, the determination made by the Password Service 501 may occur at a frequency that may vary, and that may be set in advance. Thus, unnecessary queries are not made. The frequency of the determination may also be set to run continuously if desired.

The information stored in the Database 520, and relied upon by the Password Service 501 can include, for example, one or more of an Application Identifier (AppID), and Internet Protocol (IP) Address and a host expiration policy.

When a change is deemed necessary, the Password Service 501 communicates with the Automatic Password Generator 515. The Automatic Password Generator generates a changed password for all components within the password service architecture. Further, the Automatic Password Generator can generate changes for other parameters, such as a certificate, a key, or a token.

As noted above, the Database 520 may store information related to the IP address of the various components. Knowledge of the IP address enables communication between the various components, and the Password Service 501.

The Password Service 501 may receive a command from a user or administrator UI through the interface 521. Further, the Password Service may also receive a command from a program API through the interface 521. This allows commands from both human and non-human sources to be able to communicate with the Password Service 501.

Further, it is noted that, Applicant's intent is to encompass equivalents of all claim elements, even if amended later during prosecution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of automatic security parameter renewal, said method comprising:
    determining if said security parameter satisfies a renewal condition, said determining comprising automatically detecting a time when a security parameter is going to expire;
    before said security parameter is expired, automatically updating said security parameter when said renewal condition is satisfied; and
    automatically updating said security parameter in dependent components of an application of said security parameter,
    wherein said automatically updating said security parameter in the dependent components comprises modifying a certificate in dependent components, by a central certification server, upon receipt of a new certificate.

2. The method according to claim 1, wherein said automatically updating comprises one or more of resetting said security parameter and updating a security parameter expiration field.

3. The method according to claim 2, wherein a value of said security parameter expiration field is set based on a security parameter expiration policy.

4. The method according to claim 1, wherein said automatically updating comprises:
    ascertaining whether a pro-approval has been obtained; and
    receiving a manual approval when said pre-approval has not been obtained.

5. The method according to claim 1, further comprising obtaining information related to a dependent application of said security parameter.

6. The method according to claim 5, further comprising automatically updating a security parameter of said dependent application.

7. The method according to claim 1, wherein said security parameter comprises one or more of a password, a license, a secure socket level (SSL) key, a certificate, and a cookie.

8. The method according to claim 1, wherein said determining whether said security parameter satisfies said renewal condition comprises comparing a security parameter expiration amount to a threshold amount.

9. The method according to claim 8, wherein said security parameter satisfies said renewal condition when said security parameter expiration amount is one of less than and equal to said threshold amount.

10. The method according to claim 1, wherein said security parameter satisfies said renewal condition upon an occurrence of a compromise.

11. A system for automatic renewal and management of a security parameter, said system comprising:
    an automatic distribution component for distributing information related to said security parameter;

an automatic renewal component for automatically updating said security parameter, before said security parameter is expired, when a renewal condition is satisfied by automatically updating said security parameter in dependent components of an application of said security parameter; and a memory device storing information on a dependency of the security parameter, wherein said automatic distribution component is configured to automatically detect a time when said security parameter is going to expire, and wherein said automatically updating said security parameter in the dependent components comprises modifying a certificate in the dependent components, by a central certification server, upon receipt of a new certificate.

12. The system according to claim 11, further comprising an automatic detection component for detection of the dependency of said security parameter.

13. The system according to claim 11, wherein said automatic distribution component comprises:
    a credential updater which provides said security parameter with an updated value; and
    a parameter distributor which distributes said updated security parameter to at least one dependent application.

14. The system according to claim 11, wherein said automatic renewal component comprises:
    a search agent which determines an expiration status of said security parameter;
    a renewal request generator which generates a renewal request based on said expiration status; and
    a parameter generator which generates an updated security parameter.

15. The system according to claim 11, further comprising a pre-approval list for determining whether a pre-approval has been obtained.

16. A security parameter management system, said system comprising:
    a security parameter service for managing a plurality of security parameters within an integrated solution;
    an automatic security parameter generator which communicates with said security parameter service; and
    an automatic renewal component for updating at least one of the plurality of parameter services, before said at least one of the plurality of parameter services is expired, when a renewal condition is satisfied by automatically updating said one of the plurality of parameter services in dependent components of an application of said one of the plurality of parameter services,
    wherein said automatically updating said one of the plurality of security parameter services in the dependent components comprises modifying a certificate in the dependent, by a central certification server, upon receipt of a new certificate, and
    wherein said security parameter service automatically detects a time when said at least one of plurality of security parameters is going to expire.

17. The system according to claim 16, wherein said security parameter service manages said security parameters based on one or more of an application ID, an Internet Protocol (IP) address, and a host expiration policy.

18. The system according to claim 16, wherein said security parameter service updates said plurality of security parameters throughout an entirety of said integrated service.

19. The system according to claim 18, wherein said security parameter updates said plurality of security parameters in response to a command, and
    wherein said command comprises one or more of a user command and an application command.

* * * * *